UNITED STATES PATENT OFFICE.

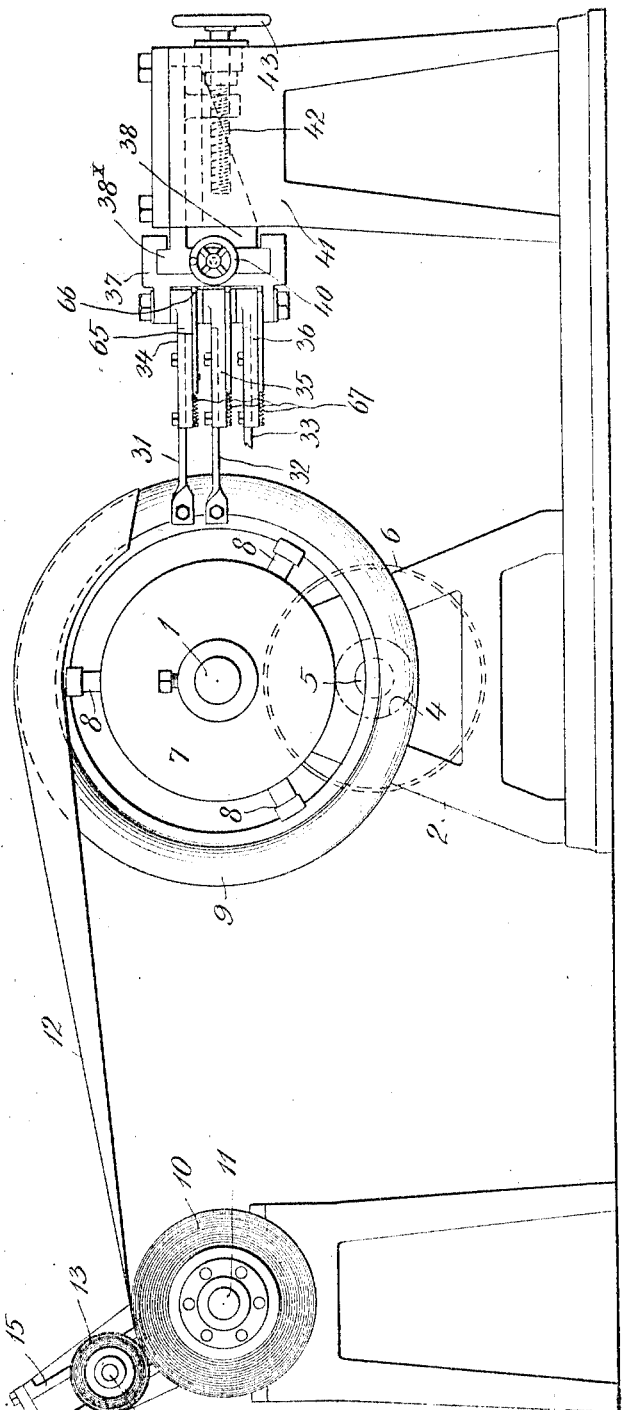

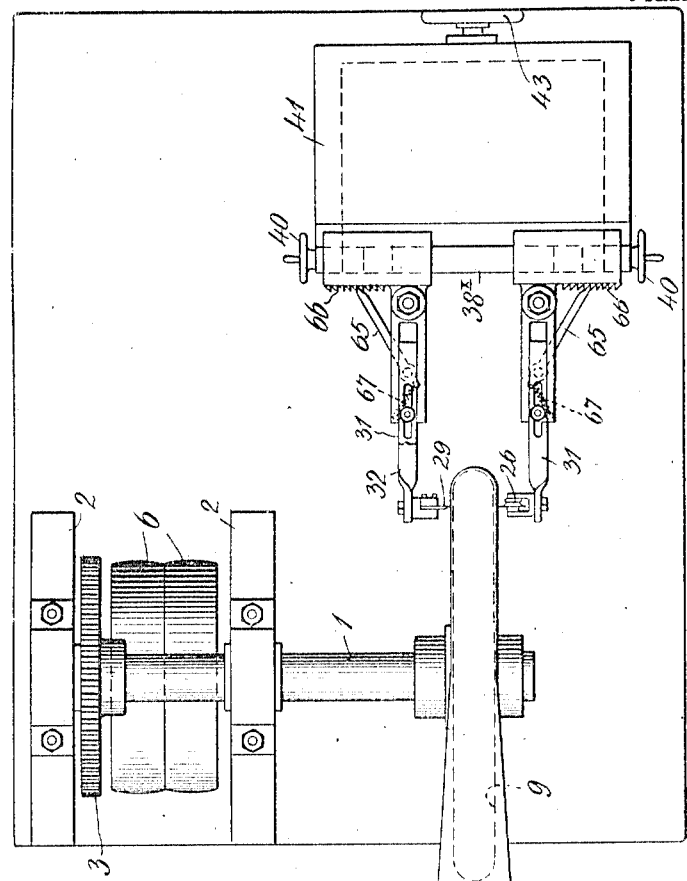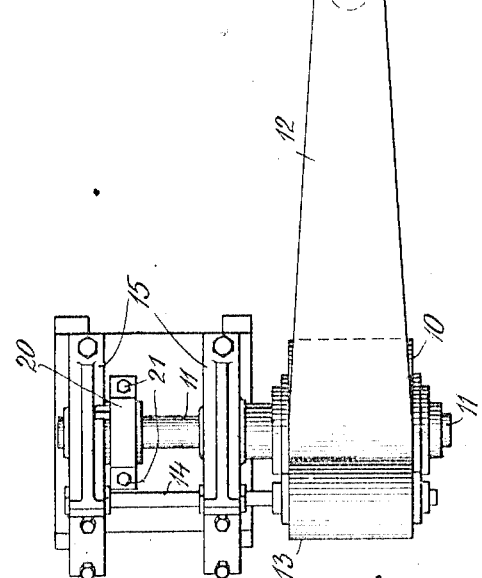

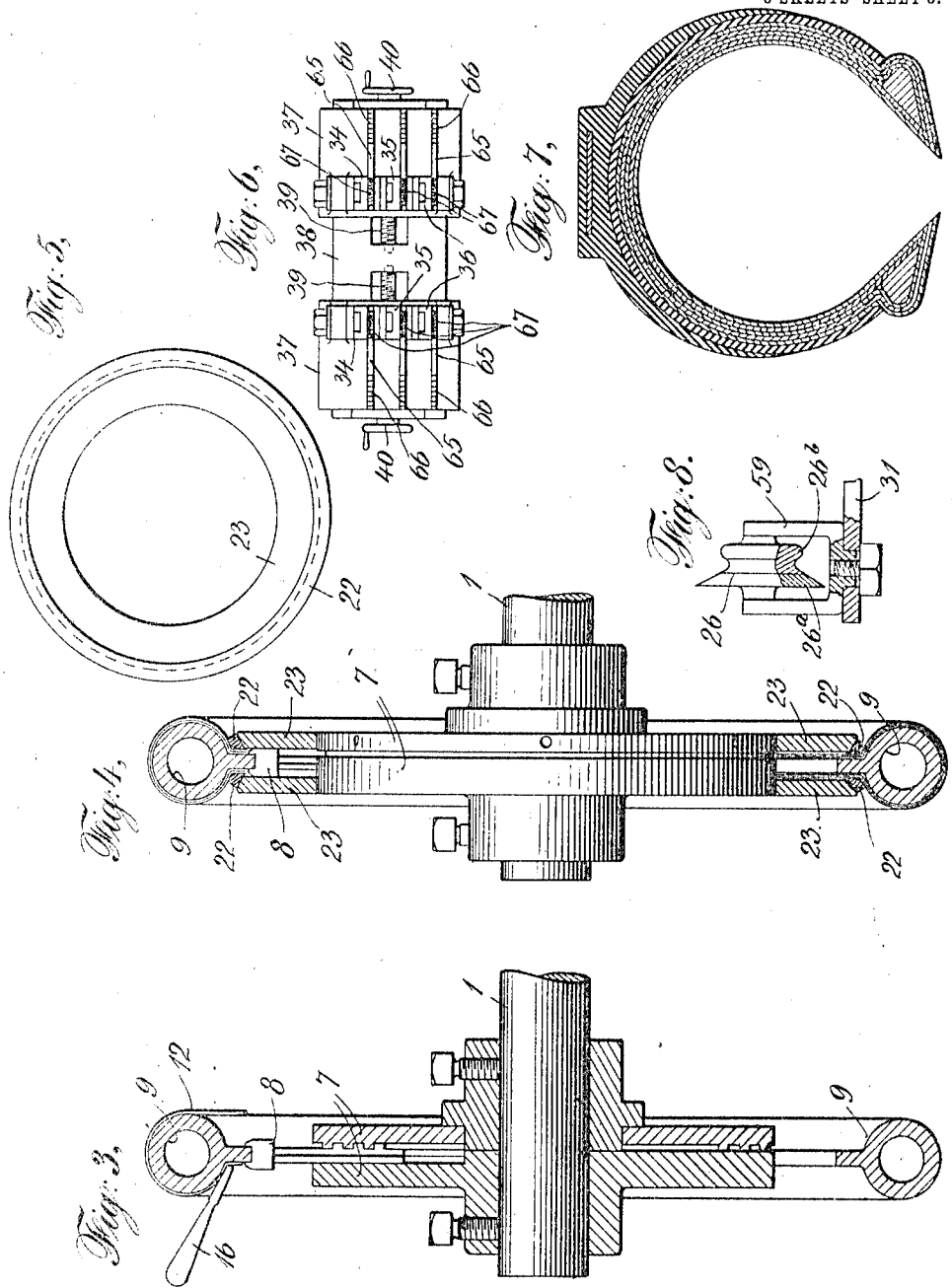

THOMAS J. WHALEN, OF NEW BRUNSWICK, NEW JERSEY, ASSIGNOR, BY MESNE ASSIGNMENTS, TO HARRY M. MARBLE, OF NEWARK, NEW JERSEY.

TIRE-MAKING MACHINE.

1,064,035.  Specification of Letters Patent.  Patented June 10, 1913.

Application filed October 6, 1910, Serial No. 585,623.  Renewed October 26, 1912.  Serial No. 727,968.

*To all whom it may concern:*

Be it known that I, THOMAS J. WHALEN, a citizen of the United States of America, and a resident of New Brunswick, county of Middlesex, and State of New Jersey, have invented a new and useful Tire-Making Machine, of which the following is a specification.

My invention relates to machines for making pneumatic tires, more especially for making shoes of clencher and "quick-detachable" types for pneumatic tires, and comprises improved tool-holding means.

The machine herein illustrated and described embodies improvements on the machine for the same purpose illustrated and described in my prior application, filed Sept. 15, 1910, Sr. No. 582,186.

The objects of my invention are, to facilitate the operation of the various tools of the machine, to facilitate the application of beads to the partly-formed tire shoe, and in general, to produce a machine which is exceedingly easy to operate and which is capable of rapid and high-grade work.

I will now proceed to describe my invention with reference to the accompanying drawings, in which one construction of machine embodying my invention is illustrated, and will then point out the novel features in claims.

In said drawings: Figure 1 shows a side elevation of my improved tire making machine; Fig. 2 shows a top view thereof; Fig. 3 shows a transverse section thereof through the chuck and core. Fig. 4 is a view similar to Fig. 3, except that the chuck is not shown in section, and except that the forms for applying the beads are shown in place on the chuck. Fig. 5 is a face view of one of the bead-applying forms. Fig. 6 shows a face view of the saddles for carrying the tool-arms, in place on their guide. Fig. 7 shows a cross section of the completed shoe. Fig. 8 is a detail view, partly in section, illustrating the swivel-connection of the tools to the tool-carrying arms.

In the drawings, 1 designates the main revoluble shaft of the machine, 2 a frame in which said shaft is revolubly mounted, 3 a gear wheel on said shaft, 4 a pinion intermeshing with said gear 3 and mounted on a shaft 5, and 6, 6 belt pulleys, one tight and one loose, on shaft 5, for applying power to drive the same.

7 designates a chuck, on shaft 1, designed to receive a core on which the tire shoe is formed. 8, 8, designate the jaws or arms of said chuck.

9 designates a ring-core, upon which the tire shoe is to be formed, mounted on said chuck.

10 designates a supply roll from which a strip of rubber-saturated fabric is drawn, during the making of the shoe, and 11 designates the shaft on which said roll is mounted.

12 designates the fabric strip.

13 designates a wrapper roll, upon which a strip of fabric, interwound with the layers of strip 12 on roll 10, is wound up as fabric 12 is drawn from roll 10.

14 designates a shaft on which wrapper roll 13 is mounted, and 15, 15 designate guides in which shaft 14 may move radially to or from the supply roll 10. Wrapper roll 13 is driven by frictional contact with the roll of fabric on roll 10. On shaft 11 of roll 10 a friction bearing box, 20, which may be set up by means of screws 21, is provided for regulating the tension under which the fabric is drawn from roll 10.

41 designates a table or support, located substantially in line with the core 9 and supply roll 10, and provided with guides for a carriage 38, which may be moved toward and from said core 9 by means of a screw 42 and hand-wheel 43. This carriage 38 is provided with a guide 38ˣ for two saddles 37, to which are pivoted tool-carrying arms 34, 35 and 36. These arms are provided with longitudinally adjustable extensions, 31, 32 and 33, respectively, to which various tools used in forming the tire may be secured. I have indicated a bead-rolling roller 26 on one of said arms, and a trimming knife 29 on another of said arms. It will be understood that duplicate tools are provided on the two sides of the core. The tools are preferably swivel-connected to their respective arms, as indicated in Fig. 8, which shows a yoke 59 for holding the bead-rolling roller 26, swivel-connected to its corresponding arm.

In so far as yet described the machine is substantially the same as the machine illustrated and described in my said application Sr. No. 582,186. I will now proceed to describe the features in which the machine herein described differs from that of my said prior application.

In the machine herein illustrated and described, the two saddles, 37, carrying the tool-carrying arms, are provided with separate feed-screws 39 and hand-wheels 40, for moving said saddles toward and from each other, and each tool-carrying arm, 34, or 35, or 36, has pivoted to it a brace, 65, the free end of which is adapted to engage one or another of a series of teeth, 66, formed on the face of the corresponding saddle. This construction permits the saddles themselves, and the feed screws by which they are moved, to be used to press the various tools against the work. An arm, 34 or 35 or 36, having been moved to such position that its tool is in proximity to the work, and the corresponding brace, 65, having been engaged with a tooth 66 of the saddle, so as to prevent the arm from swinging back, the corresponding feed screw, 39, is rotated so as to move the saddle toward the center, thereby pressing the tool tightly against the work; and by turning such feed screw, the tool may be advanced or retracted, from time to time, as may be required.

The described construction of tool-holding and operating means, constitutes a very simple but powerful means for holding the tools to their work. By disengaging the brace of any tool arm from the teeth 66, that tool arm may be swung back out of the way, and another tool arm may then be swung up close to the work and its brace engaged with a tooth 66. It is therefore very easy to change from one tool to another, and no adjustment of the tools, after they are once set properly, is required while working on any one size and style of shoe. The two saddles 37 being entirely separate and distinct, the workman on one side of the machine advances and retreats his tools entirely independent of the actions of the workman on the other side, and can exert such pressure of the tools against the work as conditions may require.

For applying beads to the two sides of the shoe, during the making of the shoe, I preferably employ annular forms 23, adapted to fit over some member of the machine, for example, the chuck 7, whereby they may be centered with respect to the shoe in process of construction. Before placing these forms against a partly formed shoe, a previously-formed bead-ring, 22, of suitable material, is mounted on the periphery of each form 23; and it is then easy to transfer such bead-ring to the partly formed tire, by mounting the form on the chuck, pressing it against the partly-formed shoe, and then pressing the bead-ring against the partly-formed shoe, with a suitable tool, while the core 9 rotates, so causing the bead-ring to adhere to the shoe; after which the form 23 may be removed.

Heretofore, in machines for forming tire-shoes, the beads have usually been applied from continuous bead-strips, fed to the shoe by means of carefully adjusted feeding devices. The application of the beads in this way is a somewhat delicate operation. Applying the beads in the manner herein described, by means of the forms 23, is a much simpler operation, which may be performed much more rapidly, and the beads, when applied, are applied in precisely the proper place, and are truly concentric. It is a very easy matter to form the bead-rings before placing them on the forms, and such rings may be made by unskilled labor.

In forming tire shoes by means of the machine shown and described herein, the method of operation is as follows: The ring-core, 9, is first coated with rubber cement, and the end of the fabric-strip, 12, is drawn from roll 10 and applied to the ring-core, and the ring-core is then set in rotation, so winding the fabric-strip upon it; and as the fabric is so wound on the core, the workmen, with hand-tools, termed spades, press the fabric in against the under side of the ring-core. The tension with which the fabric 12 is drawn from the roll 10 may be relied upon to insure tight winding of the fabric on the core, or, if necessary, pressure rollers, applied by hand or otherwise, may be used for rolling down the fabric as the winding proceeds. After a suitable number of layers of the fabric have been wound upon the core in this manner (two layers are usually considered sufficient), the bead-rings 22 are applied in the manner previously describe, and the winding of the fabric is continued, the fabric being now caused to cover the beads. Grooved bead-perfecting rolls, 26, carried by certain of the tool arms, are also pressed against the beads, by the means hereinbefore described, and by their pressure perfect the form of the beads and also press the outer layers of fabric tightly against the beads, so causing the various layers of fabric to adhere tightly. After a sufficient number of these outer layers of fabric have been applied, the strip of fabric 12 is cut, its end pressed tightly down on the layers of fabric beneath, and one or more layers of gum are applied to the outer portion of the tire to form what is termed the "padding." This padding usually covers the entire outer surface of the carcass as so far formed, from the bead on one side thereof to the bead on the other side thereof. Such layer or layers of gum may be applied by hand, or, and preferably, may be applied by substituting in the machine, for the fabric supply roll 12, another supply roll carrying a gum strip. The gum is wound upon the partly formed carcass in the same way as the fabric; and, usually, is pressed down tightly as so wound, by rollers held by hand or otherwise against the carcass. Another strip of gum, somewhat narrower, and, usually, considerably thicker than the strip for forming the padding, is then applied to what is to be the tread surface of the shoe, in a similar manner. The construction of the shoe is then complete, and it is ready for the curing, which latter is done in the ordinary manner.

16, in Fig. 3, designates one of the spades, i. e., the hand tools used in pressing the fabric against the core.

The two-part roller 26 for perfecting the bead of the shoe, comprises two flanges, one of very great diameter as compared with the other and with the bottom of the groove between said flanges; and I have found that if the roller be formed in one piece, it is apt to roughen the surface of the shoe, owing to the different peripheral speeds of the two flanges. To obviate this objection, I form the roller in two parts, 26ª and 26ᵇ, which, being separate from each other, though mounted on the same axis, can rotate independently. Thereby roughening of the surface of the tire shoe is obviated.

The forms 23 for applying the beads, and the two-part bead rollers 26, are illustrated and described in my above-mentioned prior application, Sr. No. 582,186, but are not there specifically claimed. I do not in this application claim broadly the carriage 38 having mounted on it the hinged tool-carrying arms, as this feature is claimed in my said prior application.

Numeral 67, in Figs. 1 and 2, designates tension springs tending to hold the braces 65 in engagement with the teeth 66.

I do not in this application claim the means for applying beads, herein illustrated and described, for the reason that the same are claimed in a divisional application, filed November 2, 1910, Sr. No. 590,345.

What I claim is:—

1. A tire forming machine comprising in combination a rotatable core, upon which the tire may be formed, a tool-arm support arranged to move laterally with respect to said core, a tool-arm hinged to said support, and a brace adapted to engage both said arm and said support and thereby to hold the arm rigid with respect to its support.

2. A tire forming machine comprising in combination a rotatable core, upon which the tire may be formed, a tool-arm support arranged to move laterally with respect to said core, a tool-arm hinged to said support, and a brace hinged to one of said hinge-connected members and adapted to engage one or more notches in the other of said hinge-connected members, and thereby to hold the arm rigid with respect to its support.

In testimony whereof I have signed this specification in the presence of two subscribing witnesses.

THOMAS J. WHALEN.

Witnesses:
H. M. MARBLE,
D. A. DAVIES.